United States Patent
Zhang et al.

(10) Patent No.: US 12,476,909 B2
(45) Date of Patent: Nov. 18, 2025

(54) INFORMATION PROCESSING METHOD, AND DEVICE AND STORAGE MEDIUM

(71) Applicant: ZTE CORPORATION, Shenzhen (CN)

(72) Inventors: Zheng Zhang, Shenzhen (CN); Min Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/547,731

(22) PCT Filed: Mar. 4, 2022

(86) PCT No.: PCT/CN2022/079389
§ 371 (c)(1),
(2) Date: Aug. 24, 2023

(87) PCT Pub. No.: WO2022/199365
PCT Pub. Date: Sep. 29, 2022

(65) Prior Publication Data
US 2024/0056389 A1    Feb. 15, 2024

(30) Foreign Application Priority Data
Mar. 25, 2021  (CN) .......................... 202110321350.8

(51) Int. Cl.
*H04L 45/00*   (2022.01)
*H04L 12/46*   (2006.01)
*H04L 45/741*  (2022.01)

(52) U.S. Cl.
CPC ........ *H04L 45/566* (2013.01); *H04L 12/4633* (2013.01); *H04L 45/20* (2013.01); *H04L 45/741* (2013.01)

(58) Field of Classification Search
CPC ... H04L 45/566; H04L 12/4633; H04L 45/20; H04L 45/741
See application file for complete search history.

(56) References Cited

U.S. PATENT DOCUMENTS 7,983,174 B1 *  7/2011  Monaghan .............. H04L 45/50
                                                        370/242
11,902,153 B1 *  2/2024  Bonica ................... H04L 69/04
(Continued)

FOREIGN PATENT DOCUMENTS

CN        102340451 A     2/2012
CN        110324165 A    10/2019
(Continued)

OTHER PUBLICATIONS

International Search Report in Application No. PCT/CN2022/079389, dated May 26, 2022, 4 pages, including translation.
(Continued)

*Primary Examiner* — William G Trost, IV
*Assistant Examiner* — Monishwar Mohan
(74) *Attorney, Agent, or Firm* — Morgan, Lewis & Bockius LLP

(57) ABSTRACT

Provided are an information processing method and device and a storage medium. The method includes: in response to receiving a traceroute packet sent by a second-type network node, performing outer tunnel encapsulation on the traceroute packet to obtain a double-layer Internet protocol (IP) packet, wherein the double-layer IP packet comprises: a traceroute packet and a first public network tunnel packet, the first public network tunnel packet carries a hop-by-hop option header (HBH) extension header or a destination option header (DOH) extension header, and the HBH extension header or the DOH extension header carries a hop limit field of the traceroute packet and source segment identifier (SID) information assigned to the second-type network node by a first-type network node.

14 Claims, 6 Drawing Sheets

(56) References Cited

U.S. PATENT DOCUMENTS

| | | | | |
|---|---|---|---|---|
| 2020/0162589 A1* | 5/2020 | Vijayadharan | .......... | H04L 41/16 |
| 2021/0014158 A1* | 1/2021 | Zhang | .................... | H04L 45/20 |
| 2022/0141117 A1* | 5/2022 | Zhao | ....................... | H04L 43/10 |
| | | | | 370/252 |
| 2023/0078123 A1* | 3/2023 | Zhang | .................... | H04L 45/74 |
| | | | | 709/238 |

FOREIGN PATENT DOCUMENTS

| | | | |
|---|---|---|---|
| WO | WO 2020/136660 A1 | 7/2020 | |
| WO | WO 2020/168549 A1 | 8/2020 | |
| WO | WO2021/009554 A1 | 1/2021 | |

OTHER PUBLICATIONS

Extended European Search Report in Application No. 22774027.1, dated Oct. 24, 2024, 13 pages.

S. Bhandari et al., "In-situ OAM IPv6 Options", Internet-Draft: IPPM, Internet Engineering Task Force, IETF; Standardworkingdraft, Internet Soc, No. 5, Feb. 21, 2021 (Feb. 21, 2021), pp. 1-14, XP015144456, Retrieved from the Internet: URL: https://tools.ietf.org/html/draft-ietf-ippm-ioam-ipv6-options-05.

Z. Ali, "Operations, Administration, and Maintenance (OAM) in Segment Routing Networks with IPv6 Data plane (SRv6)", DRAFT-IETF-6MAN-SPRING-SRV6-OAM-03.TXT; Internet-Draft: 6MAN, Internet Engineering Task Force, No. 3, Dec. 19, 2019 (Dec. 19, 2019), pp. 1-20, XP015137016, Retrieved from the Internet: URL: https://tools.ietf.org/html/draft-ietf-6man-spring-srv6-oam-03.

* cited by examiner

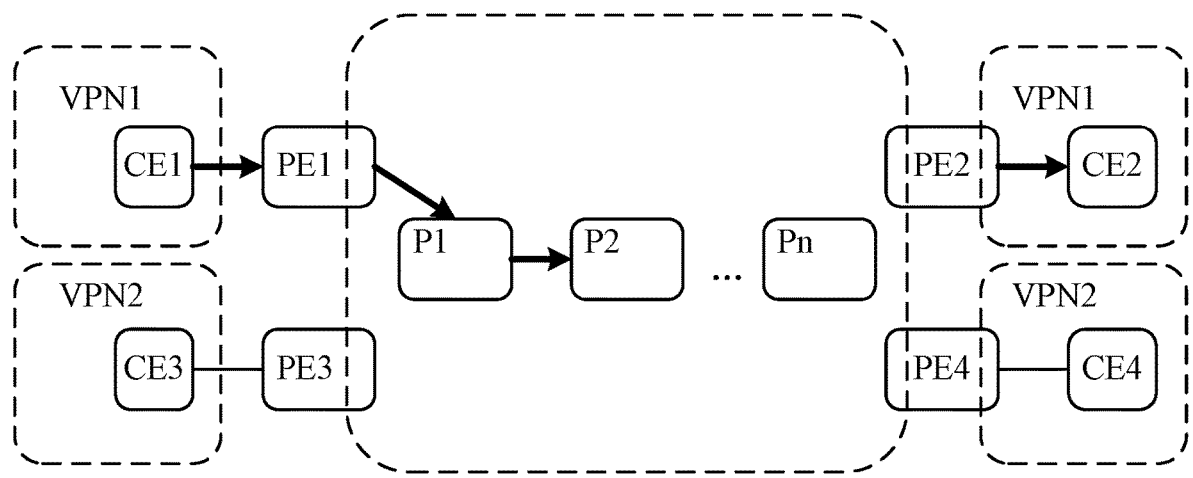
FIG. 1
In response to receiving a traceroute packet sent by a second-type network node, perform outer tunnel encapsulation on the traceroute packet to obtain a double-layer Internet protocol (IP) packet ⎯S110
FIG. 2
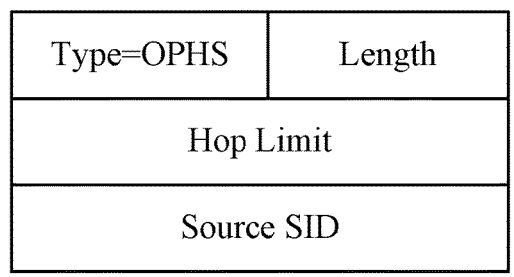
FIG. 3
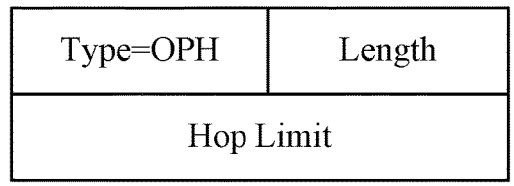
FIG. 4

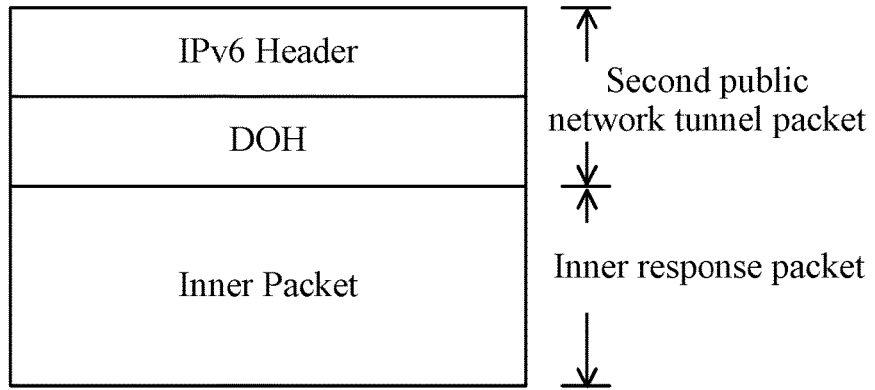
FIG. 8
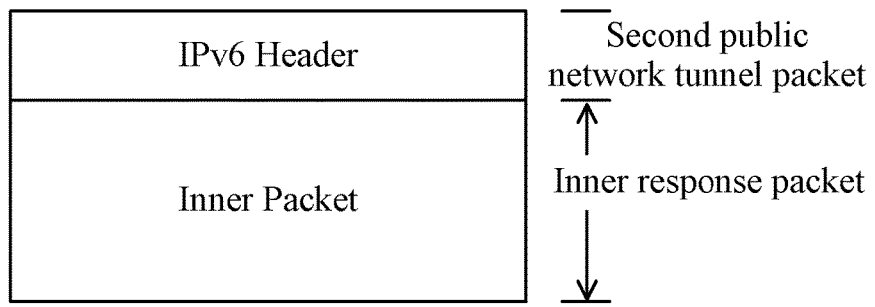
FIG. 9
Receive a double-layer Internet protocol (IP) packet sent by a first-type network node ~S210
FIG. 10

INFORMATION PROCESSING METHOD, AND DEVICE AND STORAGE MEDIUM

CROSS REFERENCE TO RELATED APPLICATIONS

This is a National Stage Application filed under 35 U.S.C. 371 based on International Patent Application No. PCT/CN2022/079389, filed on Mar. 4, 2022, which claims priority to Chinese Patent Application No. 202110321350.8 filed on Mar. 25, 2021, the disclosures of which are incorporated herein by reference in their entireties.

TECHNICAL FIELD

The present application relates to the field of communications, for example, to an information processing method and device and a storage medium.

BACKGROUND

At present, when a virtual private network (VPN) user needs to cross a public network to implement Operations, Administration and Maintenance (OAM) means such as traceroute, the obtained transmission path does not contain the attribute information of network nodes in the public network. At this point, the user cannot know the path situation in the public network and cannot perform fault location when a fault occurs in the path in the public network, causing the failure in the correct application of the OAM to the VPN user.

SUMMARY

In view of the above, embodiments of the present application provide an information processing method and device and a storage medium to achieve the simple and convenient access to the attribute information of network nodes in a public network while the traceroute function is performed.

The embodiments of the present application provide an information processing method. The method is applied by a first-type network node and includes the following.

In response to receiving a traceroute packet sent by a second-type network node, outer tunnel encapsulation is performed on the traceroute packet to obtain a double-layer Internet protocol (IP) packet, where the double-layer IP packet includes a traceroute packet and a first public network tunnel packet, the first public network tunnel packet carries a hop-by-hop option header (HBH) extension header or a destination option header (DOH) extension header, and the HBH extension header or the DOH extension header carries a hop limit field of the traceroute packet and source segment identifier (SID) information assigned to the second-type network node by a first-type network node.

The embodiments of the present application provide an information processing method. The method is applied by a third-type network node and includes the following.

A double-layer IP packet sent by a first-type network node is received, where the double-layer IP packet includes a traceroute packet and a first public network tunnel packet, the first public network tunnel packet carries an HBH extension header or a DOH extension header, and the HBH extension header or the DOH extension header carries a hop limit field of the traceroute packet and source SID information assigned to a second-type network node by the first-type network node.

The embodiments of the present application provide an information processing apparatus. The apparatus is applied by a first-type network node and includes an encapsulator.

The encapsulator is configured to, in response to receiving a traceroute packet sent by a second-type network node, perform outer tunnel encapsulation on the traceroute packet to obtain a double-layer IP packet, where the double-layer IP packet includes a traceroute packet and a first public network tunnel packet, the first public network tunnel packet carries an HBH extension header or a DOH extension header, and the HBH extension header or the DOH extension header carries a hop limit field of the traceroute packet and source SID information assigned to the second-type network node by the first-type network node.

The embodiments of the present application provide an information processing apparatus. The apparatus is applied by a third-type network node and includes a receiver.

The receiver is configured to receive a double-layer IP packet sent by a first-type network node, where the double-layer IP packet includes a traceroute packet and a first public network tunnel packet, the first public network tunnel packet carries an HBH extension header or a DOH extension header, and the HBH extension header or the DOH extension header carries a hop limit field of the traceroute packet and source SID information assigned to a second-type network node by the first-type network node.

The embodiments of the present application provide an information processing device. The device includes a communication module, a memory, and one or more processors.

The communication module is configured to perform communication interaction among various network nodes.

The memory is configured to store one or more programs.

The one or more programs, when executed by the one or more processors, enable the one or more processors to implement the method of any one of the preceding embodiments.

The embodiments of the present application provide a storage medium. The storage medium is configured to store a computer program, and the computer program, when executed by a processor, implements the method of any one of the preceding embodiments.

BRIEF DESCRIPTION OF DRAWINGS

FIG. 1 is a structure diagram of an SRv6-based IP VPN network in the existing art;

FIG. 2 is a flowchart of an information processing method according to an embodiment of the present application;

FIG. 3 is a schematic diagram of a combined encapsulation form according to an embodiment of the present application;

FIG. 4 is a schematic diagram of a separated encapsulation form according to an embodiment of the present application;

FIG. 8 is a schematic diagram of encapsulation corresponding to a response packet according to an embodiment of the present application;

FIG. 9 is a schematic diagram of encapsulation corresponding to another response packet according to an embodiment of the present application;

FIG. 10 is a flowchart of another information processing method according to an embodiment of the present application;

DETAILED DESCRIPTION

Figure 5:
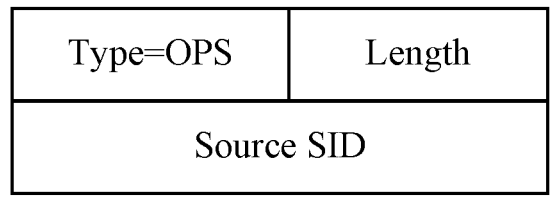
FIG. 5 is a schematic diagram of another separated encapsulation form according to an embodiment of the present application.

Embodiments of the present application are described below in conjunction with drawings. The present application will be described in conjunction with the drawings of embodiments, and the embodiments described herein are intended to explain the present application and not to limit the scope of the present application.

The VPN is currently widely used as an important means for achieving user isolation in an IP network. The use of the VPN enables users of different enterprises or different regions to deliver information on a public network. FIG. 1 is a structure diagram of an SRv6-based IP VPN network in the existing art. As shown in FIG. 1, the network composed of provider edges (PEs) and provider (P) nodes in the middle is a public network, the customer edge (CE) 1 and the CE2 belong to the VPN1 network, and the CE3 and the CE4 belong to the VPN2 network. The CE nodes (for example, CE1, CE2, CE3, and CE4) are customer devices in a private network, such as hosts, routers or exchanges. The PE nodes are edge devices in the public network, the P nodes are intermediate devices in the public network, and the PE nodes and the P nodes are routers. The CE1 and the CE2 may communicate with each other through the public network, the CE3 and the CE4 may also communicate with each other through the public network, and traffic is not disturbed even if overlapping IP addresses exist between the two VPNs. The public network may be very large and crosses various hop nodes, and the PEs are connected through a public network tunnel when transmitting a data packet of a CE. The common type of public network tunnels currently used is usually multiprotocol label switching (MPLS) tunnels.

The MPLS tunneling technology can establish tunnels through protocol signaling such as Label Distribution Protocol (LDP) or MPLS Traffic Engineering (MPLS TE). In a case where the number of tunnels is large, the requirements for intermediate P nodes are high. The segment routing (SR) technology is a new packet transmission technology that determines a transmission path at a source node and encapsulates the transmission path into a data packet. The SR technology has the characteristics of stateless intermediate nodes and no need of protocol signaling for tunnel establishment. The SR technology includes the SR-MPLS technology and the SRv6 technology. The SRv6, that is, Segment Routing over IPv6, is a segment routing technology based on Internet Protocol version 6 (IPv6). Such technology can carry an IPv6 path in an IPv6 network by adding a segment routing header (SRH) extension header to an IPv6 data plane.

The PING technology and the traceroute technology are common network fault detection technologies. Time-to-live (TTL) of an IPv4 or MPLS packet, or a hop limit field of IPv6 (hereinafter collectively referring to the field as the hop limit field) is used in the traceroute technology. The hop limit field is sequentially increased from one. On the path toward the final destination, each hop node reads the field during the processing of the packet, decrements the field by one, processes the packet when the field is decremented to zero, and returns a response packet. In this manner, each hop node through which the packet passes returns a response packet until the packet finally arrives at the destination node, thereby deriving the entire path. The implementation of the traceroute technology of IPv6 is defined in the RFC4443.

With the development of network applications, the network fault detection technologies are increasingly applied. However, as the complexity of network deployment is increasing, how to quickly know a network and locate faults becomes a problem that needs to be solved.

When a user performs detection on a network in which the user is located, that is, when the traceroute technology is applied, the user possibly crosses a public network. As shown in FIG. 1, the CE1 performs traceroute on the loopback address of the CE2. Assuming that the user network is established based on IPv4 or IPv6, the CE1 sends an IPv4 or IPv6 packet to perform traceroute, and the destination address is the loopback address of the CE2. According to the principle of the traceroute technology, the hop limit sequentially increases from one so that each hop processing node returns a response packet until the packet finally arrives at the CE2. In this manner, the user can derive the entire path. In this process, the packet passes through the public network in the middle, and the PE performs outer tunnel encapsulation on the packet, that is, the packet is double-layer encapsulated. The P nodes forward the packet only according to the outer tunnel until the packet arrives at the PE2. The hop limit of the public network tunnel is different from the hop limit of the user packet and is filled in as 255 to ensure that the packet can cross multi-hop P nodes to arrive at the PE2. The public network tunnel is usually an MPLS tunnel.

When the user performs traceroute operations, the obtained transmission path does not contain the content of the nodes in the public network. For example, when the CE1 performs traceroute on the loopback address of the CE2, the information of nodes such as P1 and P2 in the public network is not known, that is, the path from the CE1 to the CE2 is PE1-PE2-CE2. In the current technical implementation, the traceroute of the tunnel layer and the traceroute of the private network of the user are layered, the traceroute results of the tunnel layer of the public network cannot be associated with the traceroute of the private network of the user, and the user cannot know the specific transmission situation of the public network. In this manner, when a fault occurs in a public node, the user cannot locate the specific node. As shown in FIG. 1, assuming that a fault occurs in the link between the P1 and the P2, if the user initiates traceroute operations, the P1 simply discards the packet because the P1 cannot continue to forward the packet to the P2, or the P1 may return error information about the tunnel to the PE1 by some means. However, at this point, there is only the error information about the outer tunnel, and since the tunnel and the CE route or the VPN where the CE is located are not in one-to-one correspondence (for example, multiple VPNs may share the same public network tunnel), the PE1 cannot directly associate the tunnel with the CE1 and does not forward the error information to the CE1. Therefore, after the traceroute packet of the user is sent, only the reply from the PE1 is received, no other information can be received, and the faulty link between the P1 and the P2 cannot be clearly located. If the PE can be set to associate the error of the public network tunnel with the private network through special operation settings, the complexity is high for the PE, the logic is not universal, and even the normal packet forwarding is affected, so the above association is very difficult to implement.

When the public network tunnel is an MPLS scenario, although there are some solutions to the above problem currently, when the SRv6 technology is adopted in the public network tunnel, these solutions are not applicable. Therefore, new reasonable solutions are necessarily required to ensure that when the public network adopts an SRv6 tunnel, the user can obtain the entire pat using the traceroute technology, including information about the public network nodes.

In view of the above, the embodiments of the present application provide a method for carrying and processing information to enable a private network user to obtain node information of the public network across the public network when traceroute is performed without the need of associating the PE nodes with the private network of the user by performing complex special processing on PE nodes, thereby simplifying the difficulty and complexity of the implementation of the traceroute of the private network and achieving the rapid network fault location.

In an embodiment, FIG. 2 is a flowchart of an information processing method according to an embodiment of the present application. This embodiment may be performed by a first-type network node. The first-type network node may be an ingress PE, that is, a local PE, of an SRv6 network. The ingress PE refers to a PE responsible for encapsulating public network tunnel information and forwarding the public network tunnel information to other nodes of a public network when the public network tunnel information enters the public network from a private network. For example, the ingress PE may be the PE1 or the PE2 shown in FIG. 1. As shown in FIG. 2, this embodiment includes S110.

In S110, in response to receiving a traceroute packet sent by a second-type network node, outer tunnel encapsulation is performed on the traceroute packet to obtain a double-layer IP packet.

The double-layer IP packet includes a traceroute packet and a first public network tunnel packet, the first public network tunnel packet carries an HBH extension header or a DOH extension header, and the HBH extension header or the DOH extension header carries a hop limit field of the traceroute packet and source SID information assigned to the second-type network node by the first-type network node. In this embodiment, the second-type network node refers to a local CE node, that is, the CE1 or the CE3 in FIG. 1. In this embodiment, after the ingress PE receives a traceroute packet sent from a user, the ingress PE performs outer SRv6 tunnel encapsulation on the traceroute packet to obtain a double-layer IP packet. In the actual encapsulation process, an SRH extension header is encapsulated, and new options added in the HBH extension header or the DOH extension header are also encapsulated. The new options carry the hop limit information of the traceroute packet and the source SID information assigned and advertised to the private network of the user by the ingress PE.

Figure 6:
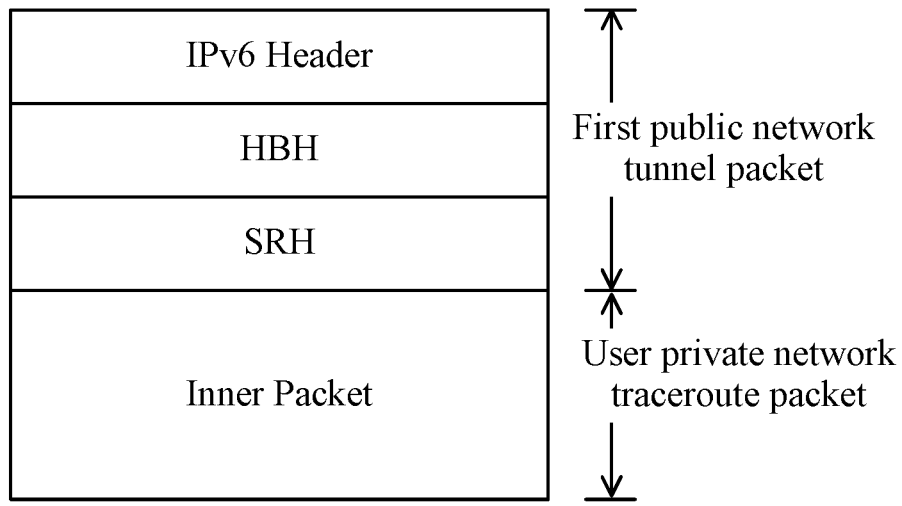
FIG. 6 is a schematic diagram of a format of an encapsulated double-layer IP packet according to an embodiment of the present application.
Figure 7:
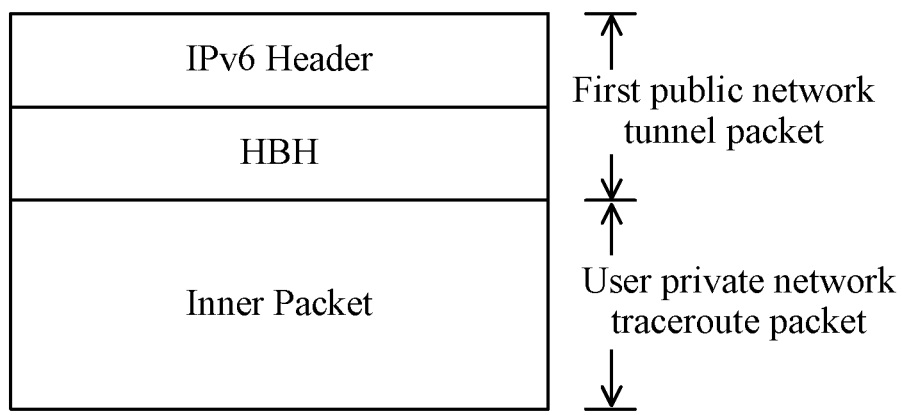
FIG. 7 is a schematic diagram of a format of another encapsulated double-layer IP packet according to an embodiment of the present application.

In an embodiment, the HBH extension header or a DOH extension header includes one of: an option hop limit and source SID (OPHS) option; or an option hop limit (OPH) option and an option source SID (OPS) option. The OPHS option carries a hop limit field and source SID information, the OPH option carries a hop limit field, and the OPS option carries source SID information. In this embodiment, the encapsulation form of the HBH extension header or the DOH extension header may be combined encapsulation or separated encapsulation. FIG. 3 is a schematic diagram of a combined encapsulation form according to an embodiment of the present application. As shown in FIG. 3, the OPHS option is encapsulated, and a hop limit field and source SID information are carried in the OPHS option. FIG. 4 is a schematic diagram of a separated encapsulation form according to an embodiment of the present application. As shown in FIG. 4, the OPH option is encapsulated, and a hop limit field is carried in the OPH option. FIG. 5 is a schematic diagram of another separated encapsulation form according to an embodiment of the present application. As shown in FIG. 5, the OPS option is encapsulated, and source SID information is carried in the OPS option. It is to be understood that the content in the OPHS option is separated into two options. FIG. 6 is a schematic diagram of a format of an encapsulated double-layer IP packet according to an embodiment of the present application. As shown in FIG. 6, after the OPHS option is encapsulated or the OPH option and the OPS option are sequentially encapsulated, a double-layer IP packet as shown in FIG. 6 is obtained. As shown in FIG. 6, the double-layer IP packet includes a traceroute packet and a first public network tunnel packet carrying an HBH extension header. FIG. 7 is a schematic diagram of a format of another encapsulated double-layer IP packet according to an embodiment of the present application. If no SRv6 tunnel is designated, the SRH extension header may be omitted from the double-layer IP packet, and the format of the double-layer IP packet obtained after encapsulation is shown in FIG. 7.

In an embodiment, the value and the length of the source SID information are determined by one of the following parameters: a route of the second-type network node or an identifier assignment mode of a VPN in which the second-type network node is located.

In an embodiment, in a case where the first-type network node assigns a label to the route of the second-type network node or the VPN in which the second-type network node is located, the length of the source SID information is a first-type byte.

In a case where the first-type network node assigns an IPv6 SID to the route of the second-type network node or the VPN in which the second-type network node is located, the length of the source SID information is a second-type byte. In this embodiment, the values of hop limits in the OPHS option and the OPH option can be modified hop by hop, and the value in the OPS option cannot be modified. The value and the length of a source SID option are determined by a route assigned to the second-type network node by the first-type network node or an identifier assignment mode of a VPN in which the second-type network node is located. For example, if the ingress PE is the route of a local CE or the VPN where the local CE is located and a label is assigned, the length of the source SID option is set to be 4 bytes, and the value of the source SID option is the value of the label; if the ingress PE is the route of the local CE or the VPN where the local CE is located and an IPv6 SID is assigned, the length of the source SID option is set to be 16 bytes, the value of the source SID option is the assigned IPv6 SID, and the format is similar to an IPv6 address.

In an embodiment, in a case where a hop limit field on which a decrement-one operation is performed is not a first value, the information processing method applied by the first-type network node further includes the following: a double-layer IP packet carrying an HBH extension header is sent to a next-hop network node; in a case where the next-hop network node is a public network node, the double-layer IP packet continues to be forwarded; and in a case where the next-hop network node is a private network node, the content of the hop limit field in the OPHS option or the content of the hop limit field in the OPH option is copied to the hop limit field of the traceroute packet, and a packet with the first public network tunnel packet stripped is forwarded to the private network node. In this embodiment, if the hop limit field in the OPHS option or the OPH option of the HBH extension header or the DOH extension header is not zero after the hop limit field is decremented by one, the double-layer IP packet is forwarded to a next-hop network node. If the next-hop network node is a next-hop node of the public network, the double-layer IP packet is normally forwarded. If the next-hop network node is a private network node, the content of the hop limit field in the OPHS option or the OPH option is copied to the hop limit field of an inner packet (that is, the traceroute packet), and the inner packet with an outer IPv6 header and extension headers (that is, the first public network tunnel packet) stripped is forwarded to the private network node.

In an embodiment, the information processing method applied by the first-type network node further includes the following: a response packet and a second public network tunnel packet returned by a third-type network node are received, and a corresponding second-type network node is associated according to the second public network tunnel packet. In this embodiment, each hop network node is required to process the HBH extension header of IPv6, that is, the options in the HBH are checked in each hop network node in the public network, including the PE nodes and the P nodes. In a case where the destination node is reached, the DOH extension header of IPv6 is required to be checked, and the options in the DOH extension header are required to be processed. When the OPHS option or the OPH option is carried, the value of the hop limit field carried by the OPHS option or the OPH option is decremented by one. If the value of the hop limit field is zero after the hop limit field is decremented by one, the packet needs to be terminated and returned. After the inner packet is read and the response packet is encapsulated according to the RFC4443, the destination address (DA) of the IPv6 packet is filled in two manners when the outer IPv6 header is encapsulated. In one manner, the DA is directly filled in as the source address (SA) of the received IPv6 packet, and the source SID information in the received OPHS option or the received OPS option is encapsulated as a DOH extension header option whose type and value are set to be the same as the type and value of the OPS option. FIG. 8 is a schematic diagram of encapsulation corresponding to a response packet according to an embodiment of the present application. As shown in FIG. 8, this manner can be used when the source SID is 4 bytes or 16 bytes. In the other manner, the source SID in the OPHS option or the OPS option is directly encapsulated into the DA of the IPv6 packet. FIG. 9 is a schematic diagram of encapsulation corresponding to another response packet according to an embodiment of the present application. As shown in FIG. 9, this method is used only in a case where the source SID is 16 bytes.

In an embodiment, the operation where the corresponding second-type network node is associated according to the second public network tunnel packet includes at least one of the following operations.

In a case where the second public network tunnel packet carries a DOH extension header and the DOH extension header carries an OPS option, the source SID information in the OPS option is read, where the source SID information is used for associating the corresponding second-type network node.

In a case where the second public network tunnel packet does not carry a DOH extension header or a DOH extension header carried by the second public network tunnel packet does not contain an OPS option, a destination address in the second public network tunnel packet is read, where the destination address is used for associating the corresponding second-type network node.

In an embodiment, after the ingress PE receives the double-layer IP packet carrying the response packet and the second public network tunnel packet, if the double-layer IP packet carries the DOH extension header, whether the double-layer IP packet carries the OPS option needs to be checked. If the double-layer IP packet carries the OPS option, the value of the source SID is read from the OPS option; if the double-layer IP packet does not carry the DOH option or the double-layer IP packet carries the DOH option but does not contain the OPS option, the value of the DA of the packet is directly read, and the local CE is associated; or the local CE is associated through a label value. After the PE strips the outer IPv6 header and extension headers, the PE forwards an inner packet to the local CE.

In an embodiment, the user network in which the network nodes in the preceding embodiments (for example, the first-type network node, the second-type network node and the third-type network node) are located includes one of: an IPv6 network, an IPv4 network or an MPLS network.

In an embodiment, the information processing process is described below using the ingress PE as an example. The ingress PE represents a PE responsible for encapsulating public network tunnel information and forwarding the obtained double-layer IP packet to other nodes of the public network when the traceroute packet enters the public network from the private network. The egress PE represents a PE responsible for stripping the public network tunnel information from the double-layer IP packet and forwarding the double-layer IP packet to a private network node when the double-layer IP packet enters the private network from the public network. Besides an IPv6 network, the user network may also be an IPv4 network, an MPLS network or other networks, and the hop limit corresponds to a TTL field and may be processed in the same manner as the hop limit in the IPv6 network. In this embodiment, the execution process of the ingress PE includes the following steps.

In step 101, the ingress PE performs SRv6 tunnel encapsulation on a user packet (that is, a traceroute packet) which serves as an inner packet at the outer layer of the user packet, and when an IPv6 header is encapsulated, sets the next header field of the IPv6 header to be the value of 0 representing the HBH extension header or to be the value of 60 representing the DOH extension header.

In step 102, an OPHS option in the HBH extension header or the DOH extension header is encapsulated, where the value of the hop limit is set to be the value of the hop limit in the user packet, and the source SID is filled in as an SID assigned to the route of a user CE (that is, the CE1 or the CE3) or the VPN in which the user CE is located by the ingress PE, as shown in FIG. 3.

The two options OPH and OPS in the extension header may be encapsulated, where the value of the hop limit in the OPH option is set to be the value of the hop limit in the user packet, and the source SID in the OPS option is filled in as an SID assigned to the route of the user CE or the VPN in which the user CE is located by the ingress PE, as shown in FIGS. 4 and 5.

In step 103, the next header of the HBH extension header or the DOH extension header is set to be the value of 43 representing a route extension header, and after the HBH extension header or the DOH extension header is encapsulated, the route extension header is encapsulated to carry an SRH option. The SRH option is used for indicating the public network SRv6 tunnel which the user message needs to pass through, and the next header of the SRH option is set to be a value representing the type of the inner packet, as shown in FIG. 6.

It is to be noted that in a case where no specific SRv6 tunnel is designated, the SRH option may be omitted. At this point, the next header of the HBH extension header or the DOH extension header is set directly to be a value representing the type of the inner packet, as shown in FIG. 7.

In an embodiment, FIG. 10 is a flowchart of another information processing method according to an embodiment of the present application. This embodiment is applied by a third-type network node. In this embodiment, the third-type network node refers to an intermediate P node, and for example, the intermediate P node includes P1, P2, . . . , or Pn shown in FIG. 1. As shown in FIG. 10, the information processing method in this embodiment includes S210.

In S210, a double-layer IP packet sent by a first-type network node is received.

The double-layer IP packet includes a traceroute packet and a first public network tunnel packet, the first public network tunnel packet carries an HBH extension header or a DOH extension header, and the HBH extension header or the DOH extension header carries a hop limit field of the traceroute packet and source SID information assigned to a second-type network node by the first-type network node. In this embodiment, the ingress PE performs outer SRv6 tunnel encapsulation on the traceroute packet to obtain a corresponding double-layer IP packet. The ingress PE determines the hop limit value of the hop limit field carried by the HBH extension header or the DOH extension header in the double-layer IP packet. If the hop limit value is not one, the double-layer IP packet is forwarded to the node P1 which is directly connected to the ingress PE. After the node P1 receives the double-layer IP packet sent by the ingress PE, if the double-layer IP packet carries the HBH extension header, since each hop node is required to process the HBH extension header, each hop node in the public network, including the PE nodes and the P nodes, processes the options in the HBH extension header.

In an embodiment, the HBH extension header includes one of: an OPHS option; or an OPH option and an OPS option.

The OPHS option carries a hop limit field and source SID information, the OPH option carries a hop limit field, and the OPS option carries source SID information.

In an embodiment, the information processing method applied by the third-type network node further includes the following: a decrement-one operation is performed on the hop limit field in the OPHS option or the hop limit field in the OPH option.

In an embodiment, in a case where a hop limit field obtained after the decrement-one operation is performed is a first value, the information processing method applied by the third-type network node further includes the following operations.

A response packet is generated according to the traceroute packet and is encapsulated.

Outer tunnel encapsulation is performed on the response packet to obtain a second public network tunnel packet; where the destination address of the second public network tunnel packet includes one of: a source address of the received first public network tunnel packet carrying the DOH extension header, the source SID information in the OPHS option or the source SID information in the OPS option, where the DOH extension header carries the source SID information in the OPHS option or the source SID information in the OPS option.

The response packet and the second public network tunnel packet are sent to the first-type network node.

In an embodiment, in a case where a hop limit field obtained after the decrement-one operation is performed is not a first value, the information processing method applied by the third-type network node further includes the following operations.

A double-layer IP packet carrying an HBH extension header is sent to a next-hop network node.

In a case where the next-hop network node is a public network node, the double-layer IP packet continues to be forwarded.

In a case where the next-hop network node is a private network node, the content of the hop limit field in the OPHS option or the content of the hop limit field in the OPH option is copied to the hop limit field of the traceroute packet, and a packet with the first public network tunnel packet stripped is forwarded to the private network node.

In this embodiment, after the third-type network node receives the double-layer IP packet, the packet processing may include the following three cases.

In case one, if the HBH extension header or the DOH extension header in the double-layer IP packet is determined to carry the OPHS option or the OPH option, the decrement-one processing is performed on the hop limit field in the OPHS option or the OPH option. If the hop limit is not zero after the hop limit is decremented by one, the third-type network node processes the packet and determines a next-hop network node. If the next-hop network node to which the packet needs to be forwarded is a public network node, the packet is normally forwarded. If the next-hop node is a private network node, the hop limit field is copied to the hop limit field of the inner packet, and with the outer IPv6 header stripped, the inner packet is encapsulated and forwarded to the private network user.

If the hop limit reaches zero after the hop limit is decremented by one, the forwarding of the packet is terminated, and the SA in the IPv6 packet and the source SID field in the OPHS or OPS option are recorded. The outer IPv6 header and extension headers are deleted, and the inner packet (that is, the traceroute packet) is read. After a corresponding response packet is generated, the IPv6 header returning to the outer layer is encapsulated. The encapsulation may be performed in two manners. In a first manner, the recorded SA of the received IPv6 packet is directly encapsulated into the DA of the IPv6 header, and a DOH extension header is encapsulated between the IPv6 header and the inner response packet, where the extension header carries the OPS option whose value is the recorded source SID, as shown in FIG. 8. This manner is applicable to the case where the source SID is a label or an IPv6 SID. In a second manner, the recorded source SID field is directly encapsulated into the DA of the IPv6 header, as shown in FIG. 9. This manner is only applicable to the case where the source SID is an IPv6 SID. Then the packet is forwarded according to the DA.

In case two, if the packet carries the DOH extension header and the DOH extension header only contains the OPS option, the source SID value in the OPS option is read for the routing lookup to determine a next-hop network node; otherwise, the next-hop network node is determined using the DA. If the next-hop network node is a private network node, the outer IPv6 header and extension headers are stripped, and the inner packet is encapsulated and then forwarded to the private network node.

In case three, if the packet contains both the HBH extension header and the DOH extension header and contains the OPHS option, the OPH option or the OPS option, an error occurs, and the processing of these options is neglected.

In an embodiment, with FIG. 1 as an example, the CE1 needs to detect the path to the CE2, and it is assumed that the user network is an IPv6 network. The user initiates path detection from the CE1, and the CE1 sends a traceroute packet. The destination address is filled in as the IPv6 loopback address of the CE2, and the source address is filled in as the IPv6 loopback address of the CE1. The PE1 advertises an IPv6 SID assigned to the route of the CE1 by the PE1 itself, and the PE2 advertises an IPv6 SID assigned to the route of the CE2 by the PE2 itself. The IPv6 SIDs may also be assigned to the VPN1 by the PE1 and the PE2, and for simplicity, the IPv6 SIDs are referred to as PE1-CE1-SID1 and PE2-CE2-SID2 in the following steps, respectively.

In this embodiment, the processing steps of each node are as follows.

In this embodiment, the processing flow of the traceroute initiator CE1 includes step 201 to step 207.

In step 201, the CE1 sends a traceroute packet, where the destination address is filled in as the address of a CE which needs to be traced, and according to the principle of the traceroute technology, the traceroute packet is sent, starting with the hop limit value of one.

The traceroute packet may be sent using an Internet Control Message Protocol (ICMP) echo request packet of IPv6 or may be sent using an IPv6-based User Datagram Protocol (UDP) packet. The UDP port is generally set to a value of 30000 or more.

In step 202, the CE1 receives a response packet and records the information of the first hop response node PE1.

In step 203, the CE1 increases the hop limit to two and continues to send the traceroute packet.

In step 204, the CE1 receives a response packet and records the information of the second hop response node P1.

In step 205, the CE1 increases the hop limit by one and continues to send the traceroute packet.

In step 206, the CE1 receives a response packet and records the information of the response nodes P2, . . . , and Pn.

In step 207, the CE1 continues to increase the hop limit, repeats steps 205 to 206, and records the information of each response node until the response packet of the destination CE2 is finally received.

In this embodiment, the processing flow of the ingress PE (that is, the PE1) includes step 301 to step 303.

In step 301, the PE1 identifies the traceroute packet (an ICMP echo request) sent from the CE, decrements the hop limit by one, terminates the forwarding of the packet if the hop limit reaches zero after the decrement, encapsulates the response packet according to the RFC4443, and feeds back the response packet to the CE1, and then the flow ends.

The PE1 generates an echo reply packet according to the RFC4443, where the DA is filled in as the SA of the received echo reply packet, and the SA is filled in as a private network address of the PE1 in the VPN1.

In step 302, if the hop limit does not reach zero after the hop limit is decremented by one, the packet needs to be forwarded. According to the destination address (the loopback address of the CE2) of the packet, the PE1 discovers that the next-hop PE is the PE2 and that the SRv6 tunnel needs to be encapsulated to cross the public network when the packet arrives at the PE2. Then, the encapsulation flow of the ingress PE is adopted. The OPHS option is encapsulated into the HBH extension header, the value of the hop limit of the OPHS option is filled in as the value of the hop limit in the user traceroute packet, and the value of the source SID is filled in as PE1-CE1-SID1. The encapsulated format is similar to the encapsulated format in FIG. 6, and then the packet is forwarded to the next-hop node P1. Then the flow ends.

If a designated SRH exists between the PE1 and the PE2, the last segment of the SRH may be filled in as PE2-CE2-SID2, and the DA of the packet is filled in as the address of a designated next-hop segment, such as the P1. If no designated SRH exists between the PE1 and the PE2, the DA of the packet is directly filled in as PE2-CE2-SID2.

In step 303, the PE1 receives a packet from the public network. At this point, the PE1 is actually the egress PE, and the packet is processed using the processing flow of the egress PE.

In this embodiment, the processing flow of the P node includes step 401 to step 404. The flow is applicable to all P nodes, including P1, P2, . . . , and Pn.

In step 401, the P node receives an IPv6 packet. When the P node discovers that the packet carries the HBH extension header, the P node processes the options in the HBH extension header, and if the packet carries the OPHS option or the OPH option, the P node decrements the hop limit field in the option by one.

In step 402, if the hop limit is not zero after the hop limit is decremented by one, the P node reads the SRH extension header located after the HBH extension header, processes the packet according to the SRH extension header, and forwards the packet to the next-hop node. If the SRH extension header does not exist, the P node directly forwards the packet to the next-hop node according to the DA in the IPv6 packet header.

In step 403, if the hop limit reaches zero after the hop limit is decremented by one, the P node terminates the forwarding of the packet and records the source SID field in the OPHS option or the OPS option. The P node records the SA of the packet and the source SID information in the HBH extension header, strips the IPv6 header and extension headers of the packet, and reads the inner packet. The inner packet is a traceroute echo request packet. The P node generates a corresponding echo reply packet according to the RFC4443, where the DA is filled in as the SA of the echo request packet, and the SA may be filled in as the interface address of the P node at which the packet is received or as the loopback address of the P node. The P node encapsulates the outer IPv6 header, where the loopback address of the ingress PE (that is, the SA at which the IPv6 packet is received) is filled into the DA of the IPv6 header. The P node encapsulates the DOH extension header between the IPv6 header and the inner response packet, where the extension header carries the OPS option whose value is the recorded source SID, as shown in FIG. 8. The DA of the outer IPv6 header may also be directly filled in as the source SID, that is, PE1-CE1-SID1, as shown in FIG. 9.

In step 404, the P node forwards the packet according to the DA of the encapsulated outer IPv6 header.

In this embodiment, the processing flow of the egress PE (that is, the PE2 or the PE4) includes step 501 to step 503.

In step 501, the PE1 receives the packet forwarded from the public network, and when the packet does not carry the HBH extension header, the packet is processed according to step 502.

In step 502, since the DA of the packet may be the loopback address of the PE1 according to the encapsulation in step 403, the PE1 further checks whether the DOH extension header and the OPS option exist, and if the OPS option exists, the PE1 reads the source SID field in the OPS option. In another case, the DA of the packet is PE1-CE1-SID1, and then the PE1 can directly associate the packet with the CE 1. After the PE1 strips the outer IPv6 header of the packet and the extension headers such as the DOH extension header, the PE1 sends the inner packet to the CE1, and then the flow ends.

In step 503, the PE2 receives the packet forwarded by the public network. When the packet carries the HBH extension header and contains the OPHS option or the OPH option, it is indicated that the packet normally arrives at the egress PE according to the public network tunnel forwarding. The PE2 decrements the hop limit by one, and when the hop limit reaches zero after the decrement, terminates the forwarding of the packet. The PE2 encapsulates the response packet according to the steps similar to the processing flow steps 402 to 404 of the P node and sends the response packet to the PE1, and then the flow ends. When the hop limit does not reach zero after the hop limit is decremented by one, the value of the hop limit in the OPHS option or the OPH option in the HBH extension header is copied to the hop limit field of the inner packet. According to the DA of the outer IPv6 header or PE2-CE2-SID2 which is the last segment of the carried SRH extension header, the PE2 associates the packet with the CE2. After the outer IPv6 header and the extension headers are stripped, the inner packet is forwarded to the CE2.

In this embodiment, the entire processing flow includes step 1101 to step 1118.

In step 1101, the CE1 sets the hop limit to be one. After the PE1 receives the packet, the PE1 decrements the hop limit by one, terminates the forwarding of the packet when the hop limit reaches zero after the decrement, generates a response packet, and sends the response packet to the CE1.

In step 1102, the CE1 continues to send the traceroute packet and sets the hop limit to be two.

In step 1103, the PE1 receives the packet and decrements the hop limit by one. When the hop limit does not reach zero after the hop limit is decremented by one, the PE1 discovers through routing lookup that the packet needs to be sent to the remote PE2 and that SRv6 tunnel encapsulation may need to be performed. Then, the PE1 encapsulates the packet according to the encapsulation steps of the ingress PE, carries an OPHS option or both OPH and OPS options in the HBH extension header, and forwards the packet to the next-hop node P1.

In step 1104, the node P1 receives the packet, discovers that the packet carries the HBH extension header after the IPv6 header, decrements the hop limit field in the carried OPHS option or OPH option by one, terminates the forwarding of the packet when the hop limit field reaches zero after the decrement, and performs the processing in the following steps.

In step 1105, the node P1 records the received IPv6 tunnel encapsulation information, strips the outer tunnel packet, processes the inner packet, encapsulates the response packet according to the RFC4443, and then performs encapsulation on the outer IPv6 header, where the DA of the outer IPv6 header is filled in as the SA of the received IPv6 packet, the DOH extension header is carried, the DOH extension header carries the OPS option, and the value of the source SID is the source SID in the received HBH extension header, that is, PE1-CE1-SID1 information. In another encapsulation manner, the address of the outer IPv6 header is directly filled as PE1-CE1-SID1. The SA of the outer IPv6 header may be filled in as the loopback address of the node P1 or the address of another interface, which is not limited here.

In step 1106, the node P1 sends the packet to the next-hop device according to the outer DA, where the next-hop device is the PE1.

In step 1107, the PE1 receives the packet. According to the difference in the DA, the encapsulation includes the following two cases. In one case, the DA is the loopback address of the current PE, and after the DOH extension header is further processed, it is discovered that the source SID in the OPS option is PE1-CE1-SID1. In the other case, the DA is PE1-CE1-SID1. Therefore, the PE1 associates the packet with the CE1. The PE1 strips the outer IPv6 header and the extension headers and sends the inner packet to the CE1.

In step 1108, the CE1 continues to send the traceroute packet and increases the hop limit by one.

In step 1109, similar to step 1103, the PE1 encapsulates the packet and forwards the packet to the next-hop node P1.

In step 1110, similar to step 1104, the P1 decrements the hop limit by one and when the hop limit is not equal to zero after the decrement, directly forwards the packet to the next-hop node P2.

In step 1111, similar to step 1104, the P2 decrements the hop limit by one, discovers that the hop limit reaches zero after the decrement, encapsulates the packet in the form in step 1105, and sends the packet to the next-hop device P1.

In step 1112, the P1 forwards the packet to the PE1 according to the DA in the outer IPv6 packet.

In step 1113, the PE1 repeats the operations in step 1107, strips the outer IPv6 header, and sends the inner packet to the CE1.

In step 1114, steps 1108 to 1113 are repeated, and the CE1 receives the response packets from the PE1 and other P nodes.

In step 1115, steps 1108 to 1110 are repeated, and the PE2 receives the packet sent from the P node, decrements the hop limit by one, discovers that the hop limit reaches zero, terminates the forwarding of the packet, encapsulates the packet in the form in step 1105, and sends the packet to the next-hop device P. After hop-by-hop forwarding, the packet arrives at the PE1. The PE1 repeats the operations in step 1107 and sends the inner packet to the CE1.

In step 1116, steps 1108 to 1110 are repeated, and after the packet arrives at the PE2, the PE2 decrements the hop limit by one and discovers that the hop limit is not equal to zero. If the DA is PE2-CE2-SID2 or the DA is the loopback address of the PE2 and the last segment in the SRH is PE2-CE2-SID2, the PE2 can associate the packet with the CE2. The PE2 overwrites the value of the hop limit in the OPHS option or the OPH option in the HBH extension header with the hop limit field of the inner packet, strips the outer IPv6 header and the extension headers, and forwards the inner packet to the CE2.

In step 1117, the CE2 receives the traceroute packet, decrements the hop limit field by one, discovers that the hop limit field is equal to zero, encapsulates the response packet according to the RFC4443, and sends the response packet to the node PE2, where the DA of the response packet is the address of the CE1 and the SA is the address of the CE2. The node PE2 performs outer IPv6 tunnel encapsulation again according to the condition that the destination is the CE1. At this point, in the returned packet, the DA of IPv6 of the outer tunnel can be directly set to be PE1-CE1-SID1, and the packet is forwarded based on the DA.

In step 1118, the packet is forwarded hop by hop, and the PE1 receives the packet and repeats step 1107 until the CE1 finally collects the response packet from the CE2, thereby recording the entire path from the CE1 to the CE2, where the path includes PE1-P1-P2-. . . .-Pn-PE2-CE2.

In an embodiment, with FIG. 1 as an example, the CE1 needs to detect the path to the CE2, and it is assumed that the user network is an IPv4 network. The user initiates traceroute for path detection from the CE1. The destination address is filled in as the IPv4 loopback address of the CE2, and the source address is filled in as the IPv4 loopback address of the CE1. The PE1 advertises the label assigned to the route of the CE1 by the PE1 itself, and the PE2 advertises the label assigned to the route of the CE2 by the PE2 itself. The labels may also be assigned to the VPN1 by the PE1 and the PE2, and for simplicity, the labels are referred to as PE1-CE1-label and PE2-CE2-label2 in the following steps, respectively. In this embodiment, the response packet is not encapsulated fully according to RFC4443 because the response packet is for IPv4, but the encapsulation still refers to RFC4443 to enable the returned information to be carried.

In this embodiment, the processing steps of each node are as follows.

The processing flow of the traceroute initiator CE1 is the same as the processing steps of the traceroute initiator CE1 in the above embodiments when the user network is an IPv6 network, except that the traceroute packet here is implemented based on the IPv4 protocol. The details are not repeated here.

In this embodiment, the processing flow of the ingress PE (that is, the PE1) is substantially the same as the processing steps of the ingress PE in the above embodiments when the user network is an IPv6 network, except for the differences described below.

Figure 11:
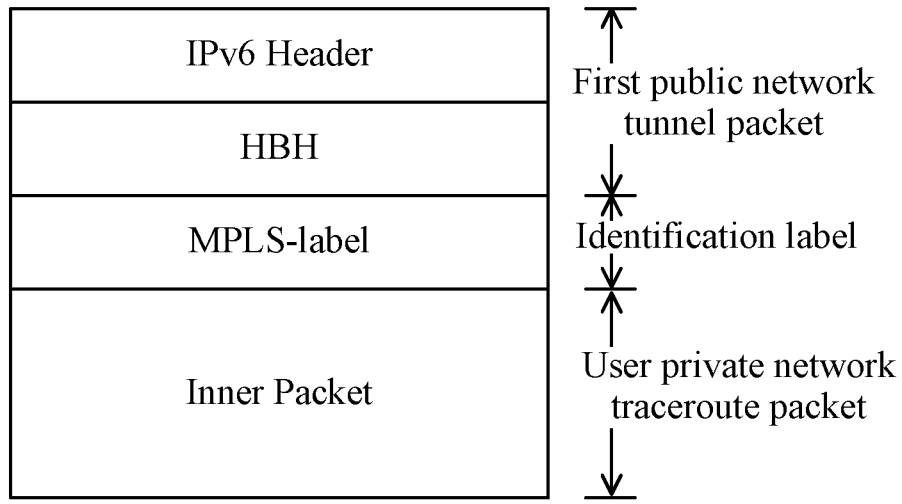
FIG. 11 is a schematic diagram of a format of an IPv4-based double-layer IP packet according to an embodiment of the present application.

FIG. 11 is a schematic diagram of a format of an IPv4 network-based double-layer IP packet according to an embodiment of the present application. The format of the encapsulated packet is shown in FIG. 11.

In step 101, when the user packet is encapsulated as an inner packet, PE2-CE-label2 is encapsulated before the inner packet.

In step 302, when the PE1 encapsulates the source SID, the filled value is PE1-CE1-label1 with a length of 4 bytes.

In step 103, after the IPv6 header, the HBH extension header and the SRH extension header are encapsulated, the next header field of the SRH extension header is set to be the value of 137 indicating that the subsequent is MPLS. When no SRv6 tunnel is designated and the SRH extension header is not encapsulated, the next header field of the HBH extension header is set to be the value of 137 indicating that the subsequent is MPLS.

The DA of the outer IPv6 header is encapsulated as the address of the next-hop node when the SRH extension header exists and is encapsulated as the loopback address of the PE2 when no SRH extension header exists.

In this embodiment, the processing flow of the P node is substantially the same as the processing steps of the P node in the above embodiments when the user network is an IPv6 network, except for the differences described below.

In step 403, when the P node records the SA of the packet and the source SID information in the HBH extension header and strips the IPv6 header and extension headers of the packet, the P node knows that the last extension header is followed by an MPLS label according to the next header information of the last extension header, and strips the MPLS label, and reads the inner packet. When the inner packet is encapsulated, the DA is filled in as the SA of the echo request packet, and the SA may be filled in as the lower 32 bits of the IPv6 address of the interface where the P node receives the packet or as the IPv4 loopback address of the P node.

The outer IPv6 header may only be encapsulated in the following manner: the loopback address (which is the SA of the received IPv6 packet) of the ingress PE is filled into the DA of the IPv6 header, the DOH extension header is encapsulated between the IPv6 header and the inner response packet, and the DOH extension header carries the OPS option whose value is the recorded source SID, that is, PE1-CE1-label1, as shown in FIG. 8.

In this embodiment, the processing flow of the ingress PE is substantially the same as the processing steps of the PE node in the above embodiments when the user network is an IPv6 network, except for the differences described below.

In step 502, the DA of the packet is the loopback address of the PE1, the PE1 further checks whether the DOH extension header and the OPS option exist, and if the OPS option exists, the PE1 reads the source SID field in the OPS option, that is, PE1-CE1-label1, and directly associates the packet with the CE1 according to the source SID field.

In step 503, the PE2 receives the packet forwarded from the public network, where the DA is the loopback address of the PE2, and when the hop limit is not zero after the hop limit is decremented by one, the PE2 processes the packet according to the steps substantially similar to the processing performed by the P node. When the hop limit reaches zero after the hop limit is decremented by one, the PE2 identifies the MPLS-type label which is located after the last extension header according to the next header type of the last extension header, reads the label, that is, PE2-CE2-label2, and associates the packet with the CE2 according to the label. The PE2 also strips the IPv6 header and the extension headers as well as the label and overwrites the hop limit value of the outer layer with the hop limit field of the inner packet.

In this embodiment, the processing flow is substantially the same as the processing steps in the above embodiments when the user network is an IPv6 network, except for the differences described below.

In step 1105, the P1 records the received IPv6 tunnel encapsulation information, knows the last extension header is followed by an MPLS-type label according to the next header information of the last extension header, strips the outer tunnel packet and the MPLS label, and processes the inner packet. When the response packet is encapsulated, the SA is filled in as the lower 32 bits of the IPv6 address of the interface of the P1 or as the IPv4 loopback address of the P1. When the outer IPv6 header is encapsulated, the DA of the outer IPv6 header is filled in as the SA of the received IPv6 packet, the DOH extension header is carried, the DOH extension header carries the OPS option, and the value of the source SID is the source SID in the received HBH extension header, that is, PE1-CE1-label1.

In step 1107, the PE1 receives the packet, where the DA is the loopback address of the current PE. The PE1 discovers that the source SID in the OPS option is PE1-CE1-label1 after the DOH extension header is further processed and associates the packet with the CE1 according to the source SID. The PE1 strips the outer IPv6 header and the extension headers and sends the inner packet to the CE1.

In step 1116, after the packet arrives at the PE2, the DA is the loopback address of the PE2. The PE2 decrements the hop limit by one and discovers that the hop limit is not equal to zero. The next header of the last extension header of the IPv6 packet is set to be followed by an MPLS-type label, and the PE2 reads the value of the MPLS label, that is, PE2-CE2-label2, and associates the packet with the CE2. The PE2 overwrites the value of the hop limit in the OPHS option or the OPH option in the HBH extension header with the hop limit field of the inner packet, strips the outer IPv6 header and the extension headers as well as the label, and forwards the inner packet to the CE2.

In an embodiment, with FIG. 1 as an example, the CE1 needs to detect the path to the CE2, and it is assumed that the user network is an IPv6 network. The user initiates traceroute for path detection from the CE1. The destination address is filled in as the loopback address of the CE2, and the source address is filled in as the loopback address of the CE1. The PE1 advertises the IPv6 SID assigned to the route of the CE1 by the PE1 itself, and the PE2 advertises the IPv6 SID assigned to the route of the CE2 by the PE2 itself. The labels may also be assigned to the VPN1 by the PE1 and the PE2, and for simplicity, the labels are referred to as PE1-CE1-SID1 and PE2-CE2-SID2 in the following steps, respectively.

Figure 12:
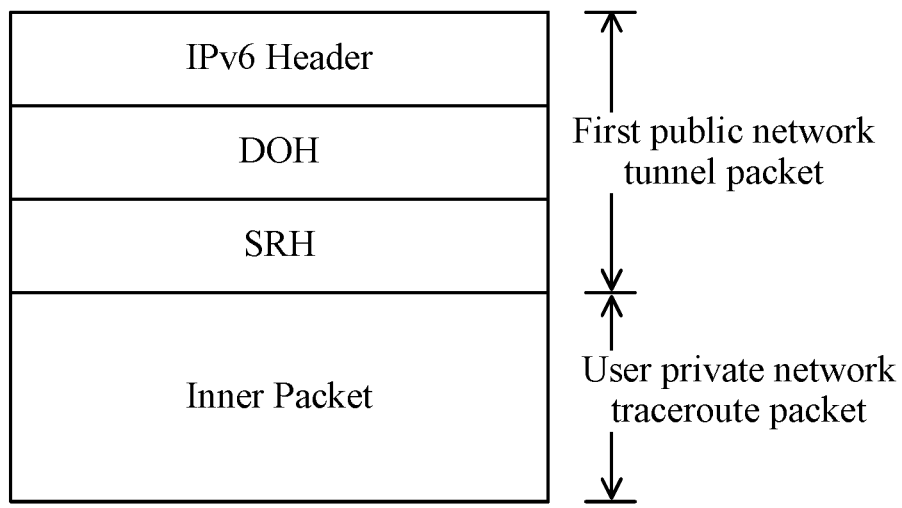
FIG. 12 is a schematic diagram of a format of an IPv6 network-based double-layer IP packet according to an embodiment of the present application.

Due to the node devices in the public network, some nodes cannot support the carrying of the OPHS option or the processing of the OPH option and the OPS option and thus need to be skipped. At this point, in a case where the HBH extension header does not carry the OPHS option or does not carry the OPH option and the OPS option, the above options are carried by the DOH extension header. These added options can be processes, or nodes which are of concern to the user and need to return information are carried by the SRH. FIG. 12 is a schematic diagram of a format of an IPv6 network-based double-layer IP packet according to an embodiment of the present application. The encapsulation format of the packet is shown in FIG. 12.

Since the DOH extension header is processed only when the DA of the packet is a local address, all nodes on the SRH path can process the options in the DOH extension header, while nodes which are not on the SRH path do not process the DOH extension header and the options therein.

Assuming that in FIG. 1, in addition to the PE1 and the PE2, only the P1 and the Pn in the public network support the processing of the added options defined in the embodiments of the present application, only the P1 and the Pn need to be included as segments into the SRH, and the final traceroute result obtained after the CE1 performs traceroute on the CE2 is the path information PE1-P1-Pn-PE2-CE2. If none of the nodes in the public network support the processing capability, the SRH may not be carried, and the DA of the packet is directly filled in as the address of the PE2 or as PE2-CE2-SID2. At this point, none of the intermediate nodes can process the added options and then return information, and the path obtained after the CE1 performs traceroute on the CE2 is PE1-PE2-CE2.

The processing steps of each node are as follows.

The processing flow of the traceroute initiator CE1 is the same as the processing steps of the traceroute initiator CE1 in the above embodiments when the user network is an IPv6 network, except that the traceroute packet here is implemented based on the IPv6 protocol. The details are not repeated here.

In this embodiment, the processing flow of the ingress PE is substantially the same as the processing steps in the above embodiments when the user network is an IPv6 network, except for the differences described below.

In step 302, the PE1 encapsulates the OPHS option into the DOH extension header or encapsulates the OPH option and the OPS option into the DOH extension header. The encapsulation format of the packet is shown in FIG. 12. The list of the public network nodes that the SRH can process and return is P1-Pn-PE2, and the DA of the outer packet is filled in as the address of the next-hop node P1.

In this embodiment, the processing flow of the P node is substantially the same as the processing steps in the above embodiments when the user network is an IPv6 network, except for the differences described below.

In steps 401 and 402, the processing performed on the HBH extension header is performed on the DOH extension header here, and the P node processes the DOH extension header and the options carried in the DOH extension header only when the DA of the packet is a local address.

In steps 403 and 404, when the P1 needs to forward the packet when the hop limit does not reach zero after the hop limit is decremented by one, since the next-hop network node recorded by the SRH is the node Pn, the DA is filled in as the node Pn when the P1 forwards the packet. Other network nodes such as the P2 do not process the DOH extension header and the options in the DOH extension header.

In this embodiment, the processing flow of the ingress PE is substantially the same as the processing steps in the above embodiments when the user network is an IPv6 network, except for the differences described below.

In step 503, the processing performed on the HBH extension header is performed on the DOH extension header here.

In this embodiment, the processing flow is substantially the same as the processing steps in the above embodiments when the user network is an IPv6 network, except for the differences described below.

In step 1103, the PE1 carries the OPHS option in the DOH extension header or carries the OPH option and the OPS option in the DOH extension header and forwards the packet to the next-hop network node P1.

In step 1104, the processing of the node P1 performed on the HBH extension header is performed on the DOH extension header here.

In step 1110, the node P1 decrements the hop limit by one and when the hop limit is not equal to zero after the decrement, forwards the packet to the next-hop node Pn, where the DA of the packet is filled in as the address of the Pn.

In steps 1111 to 1114, only the Pn returns information, and other nodes such as the P2 do not process the packet and return information.

In steps 1115 to 1116, the operations performed by the PE2 are all performed on the options in the DOH extension header here.

Figure 13:
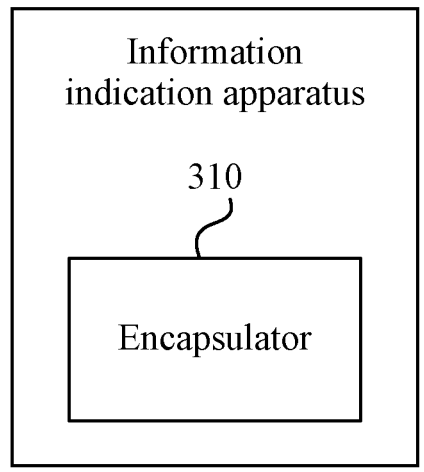
FIG. 13 is a block diagram of an information indication apparatus according to an embodiment of the present application.

In an embodiment, FIG. 13 is a block diagram of an information indication apparatus according to an embodiment of the present application. This embodiment is applied by a first-type network node. As shown in FIG. 13, this embodiment includes an encapsulator 310.

The encapsulator 310 is configured to, in response to receiving a traceroute packet sent by a second-type network node, perform outer tunnel encapsulation on the traceroute packet to obtain a double-layer IP packet, where the double-layer IP packet includes a traceroute packet and a first public network tunnel packet, the first public network tunnel packet carries an HBH extension header or a DOH extension header, and the HBH extension header or the DOH extension header carries a hop limit field of the traceroute packet and source SID information assigned to the second-type network node by the first-type network node.

In an embodiment, the HBH extension header or the DOH extension header includes one of: an OPHS option; or an OPH option and an OPS option.

The OPHS option carries a hop limit field and source SID information, the OPH option carries a hop limit field, and the OPS option carries source SID information.

In an embodiment, the value and the length of the source SID information are determined by one of the following parameters: a route of the second-type network node or an identifier assignment mode of a VPN in which the second-type network node is located.

In an embodiment, in a case where the first-type network node assigns a label to the route of the second-type network node or the VPN in which the second-type network node is located, the length of the source SID information is a first-type byte.

In a case where the first-type network node assigns an IPv6 SID to the route of the second-type network node or the VPN in which the second-type network node is located, the length of the source SID information is a second-type byte.

In an embodiment, in a case where a hop limit field obtained after the decrement-one operation is performed is not a first value, the information processing apparatus applied by the first-type network node further includes a sender, a first forwarder, and a second forwarder.

The sender is configured to send a double-layer IP packet carrying an HBH extension header to a next-hop network node.

The first forwarder is configured to, in a case where the next-hop network node is a public network node, continue to forward the double-layer IP packet.

The second forwarder is configured to, in a case where the next-hop network node is a private network node, copy the content of the hop limit field in the OPHS option or the content of the hop limit field in the OPH option to the hop limit field of the traceroute packet and forward a packet with the first public network tunnel packet stripped to the private network node.

In an embodiment, the information processing apparatus applied by the first-type network node further includes a receiver and an associator.

The receiver is configured to receive a response packet and a second public network tunnel packet returned by a third-type network node.

The associator is configured to associate a corresponding second-type network node according to the second public network tunnel packet.

In an embodiment, the operation where the corresponding second-type network node is associated according to the second public network tunnel packet includes at least one of the following operations.

In a case where the second public network tunnel packet carries a DOH extension header and the DOH extension header carries an OPS option, the source SID information in the OPS option is read, where the source SID information is used for associating the corresponding second-type network node.

In a case where the second public network tunnel packet does not carry a DOH extension header or a DOH extension header carried by the second public network tunnel packet does not contain an OPS option, a destination address in the second public network tunnel packet is read, where the destination address is used for associating the corresponding second-type network node.

In an embodiment, the user network in which a network node is located includes one of: an IPv6 network, an IPv4 network or an MPLS network.

The information processing apparatus provided in this embodiment is configured to perform the information processing method in the embodiment shown in FIG. 1. The information processing apparatus provided in this embodiment has similar implementation principles and technical effects, and the details are not repeated here.

Figure 14:
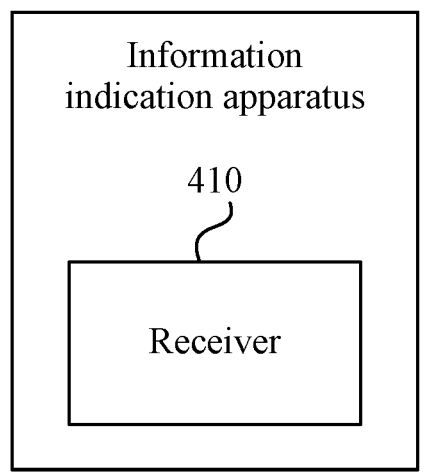
FIG. 14 is a block diagram of another information indication apparatus according to an embodiment of the present application.

In an embodiment, FIG. 14 is a block diagram of another information indication apparatus according to an embodiment of the present application. This embodiment is applied by a third-type network node. As shown in FIG. 14, this embodiment includes a receiver 410.

The receiver 410 is configured to receive a double-layer IP packet sent by a first-type network node, where the double-layer IP packet includes a traceroute packet and a first public network tunnel packet, the first public network tunnel packet carries an HBH extension header or a DOH extension header, and the HBH extension header or the DOH extension header carries a hop limit field of the traceroute packet and source SID information assigned to a second-type network node by the first-type network node.

In an embodiment, the HBH extension header includes one of: an OPHS option; or an OPH option and an OPS option.

The OPHS option carries a hop limit field and source SID information, the OPH option carries a hop limit field, and the OPS option carries source SID information.

In an embodiment, the information processing apparatus applied by the third-type network node further includes a performer.

The performer is configured to perform a decrement-one operation on the hop limit field in the OPHS option or the hop limit field in the OPH option.

In an embodiment, in a case where a hop limit field obtained after the decrement-one operation is performed is a first value, the information processing apparatus applied by the third-type network node further includes a first encapsulator, a second encapsulator, and a sender.

The first encapsulator is configured to generate a response packet according to the traceroute packet and encapsulate the response packet.

The second encapsulator is configured to perform outer tunnel encapsulation on the response packet to obtain a second public network tunnel packet, where the destination address of the second public network tunnel packet includes one of: a source address of the received first public network tunnel packet carrying the DOH extension header, the source SID information in the OPHS option or the source SID information in the OPS option, where the DOH extension header carries the source SID information in the OPHS option or the source SID information in the OPS option.

The sender is configured to send the response packet and the second public network tunnel packet to the first-type network node.

In an embodiment, in a case where a hop limit field obtained after the decrement-one operation is performed is a first value, the information processing apparatus applied by the third-type network node further includes a first forwarder, a second forwarder, and a third forwarder.

The first forwarder is configured to forward a double-layer IP packet carrying an HBH extension header to a next-hop network node.

The second forwarder is configured to, in a case where the next-hop network node is a public network node, continue to forward the double-layer IP packet.

The third forwarder is configured to, in a case where the next-hop network node is a private network node, copy the content of the hop limit field in the OPHS option or the content of the hop limit field in the OPH option to the hop limit field of the traceroute packet and forward a packet with the first public network tunnel packet stripped to the private network node.

The information processing apparatus provided in this embodiment is configured to perform the information processing method in the embodiment shown in FIG. 2. The information processing apparatus provided in this embodiment has similar implementation principles and technical effects, and the details are not repeated here.

Figure 15:
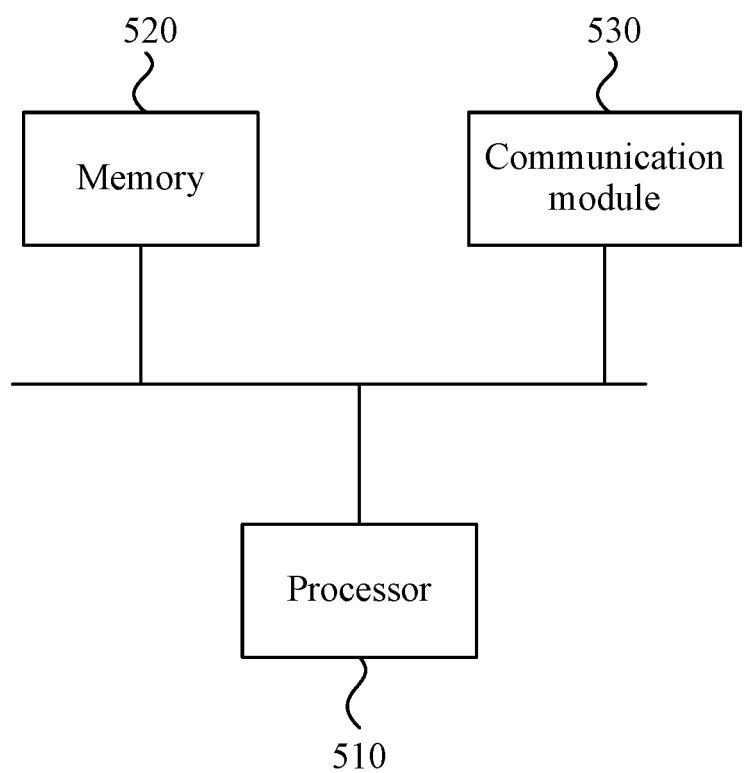
FIG. 15 is a structure diagram of an information processing device according to an embodiment of the present application.

In an embodiment, FIG. 15 is a structure diagram of an information processing device according to an embodiment of the present application. As shown in FIG. 15, the device provided in the present application includes a processor 510, a memory 520, and a communication module 530. The number of processors 510 in the device may be one or more, and one processor 510 is illustrated as an example in FIG. 15. The number of memories 520 in the device may be one or more, and one memory 520 is illustrated as an example in FIG. 15. The processor 510, the memory 520, and the communication module 630 in the device may be connected via a bus or in other manners, and the connection via a bus is illustrated as an example in FIG. 15. In this embodiment, the device may be a first-type network node (for example, the ingress PE in an SRv6 network).

The memory 520, as a computer-readable storage medium, may be configured to store software programs and computer-executable programs and modules such as program instructions/modules (for example, the encapsulator in the information processing apparatus) corresponding to the device in any embodiment of the present application. The memory 520 may include a program storage region and a data storage region. The program storage region may store an operating system and an application program required by at least one function. The data storage region may store data created according to the use of the device. In addition, the memory 520 may include a high-speed random-access memory, and may also include a non-volatile memory such as at least one disk memory, a flash memory or another non-volatile solid-state memory. In some examples, the memory 520 may further include memories remotely disposed relative to the processor 510, and these remote memories may be connected to the device via a network. Examples of the preceding network include, but are not limited to, the Internet, an intranet, a local area network, a mobile communication network, and combinations thereof.

The communication module 530 is configured to perform communication interaction among various network nodes.

For example, the communication module may be a packet sending module and a packet receiving module.

In a case where the information processing device is a first-type network node, the device provided above may be configured to execute the information processing method applied by the first-type network node in any one of the preceding embodiments and has corresponding functions and effects.

In a case where the information processing device is a second-type network node, the device provided above may be configured to execute the information processing method applied by the second-type network node in any one of the preceding embodiments and has corresponding functions and effects.

The embodiments of the present application further provide a storage medium including computer-executable instructions. The computer-executable instructions, when executed by a computer processor, are used for executing an information processing method applied by a first-type network node. The method includes: in response to receiving a traceroute packet sent by a second-type network node, outer tunnel encapsulation is performed on the traceroute packet to obtain a double-layer IP packet, where the double-layer IP packet includes a traceroute packet and a first public network tunnel packet, the first public network tunnel packet carries an HBH extension header or a DOH extension header, and the HBH extension header or the DOH extension header carries a hop limit field of the traceroute packet and source SID information assigned to the second-type network node by the first-type network node.

The embodiments of the present application further provide a storage medium including computer-executable instructions. The computer-executable instructions, when executed by a computer processor, are used for executing an information processing method applied by a second-type network node. The method includes: a double-layer IP packet sent by a first-type network node is received, where the double-layer IP packet includes a traceroute packet and a first public network tunnel packet, the first public network tunnel packet carries an HBH extension header or a DOH extension header, and the HBH extension header or the DOH extension header carries a hop limit field of the traceroute packet and source SID information assigned to a second-type network node by the first-type network node.

The storage medium may be a non-transitory storage medium.

It is to be understood by those skilled in the art that the term user device covers any suitable type of wireless user devices, such as mobile phones, portable data processing apparatuses, portable web browsers or vehicle-mounted mobile stations.

In general, the various embodiments of the present application may be implemented in hardware or special-purpose circuits, software, logic or any combination thereof. For example, some aspects may be implemented in hardware while other aspects may be implemented in firmware or software that may be executed by a controller, a microprocessor, or other computing apparatuses, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination thereof. Computer programs may be stored on the memory. The memory may be of any type suitable for a local technical environment and may be implemented using any suitable data storage technology, such as, but not limited to, a read-only memory (ROM), a random-access memory (RAM), and an optical memory apparatus and system (a digital video disc (DVD) or a compact disc (CD)). The computer-readable medium may include a non-transitory storage medium. The data processor may be of any type suitable to the local technical environment, and for example, includes, but is not limited to, a general-purpose computer, a special-purpose computer, a microprocessor, digital signal processing (DSP), an application-specific integrated circuit (ASIC), a field-programmable gate array (FPGA), and a processor based on a multi-core processor architecture.

The preceding are only some embodiments of the present application and are not intended to limit the present application. For those skilled in the art, the present application may have various modifications and variations. Any modifications, equivalent substitutions, improvements and the like made within the spirit and principle of the present application should fall within the scope of the present application.

What is claimed is:

1. An information processing method, implemented by a first-type network node, comprising:
   in response to receiving a traceroute packet sent by a second-type network node, performing outer tunnel encapsulation on the traceroute packet to obtain a double-layer Internet protocol (IP) packet, and sending the double-layer IP packet to a third-type network node;
   wherein the double-layer IP packet comprises: the traceroute packet and a first public network tunnel packet, the first public network tunnel packet carries a hop-by-hop option header (HBH) extension header or a destination option header (DOH) extension header, and the HBH extension header or the DOH extension header carries a hop limit field of the traceroute packet and source segment identifier (SID) information assigned to the second-type network node by the first-type network node;
   wherein in response to determining that the hop limit field on which a decrement-one operation is performed is not a first value, the information processing method further comprises:
      sending the double-layer IP packet carrying the HBH extension header to a next-hop network node;
      in response to determining that the next-hop network node is a public network node, continuing to forward the double-layer IP packet; and
      in response to determining that the next-hop network node is a private network node, copying content of the hop limit field in an option hop limit and source SID (OPHS) option or content of the hop limit field in an option hop limit (OPH) option to the hop limit field of the traceroute packet, and forwarding a packet with the first public network tunnel packet stripped to the private network node;
   wherein the information processing method further comprises:
      receiving a response packet and a second public network tunnel packet returned by the third-type network node; and
      associating a corresponding second-type network node according to the second public network tunnel packet; and
   wherein the first-type network node is a provider edge, the second-type network node is a customer edge, and the third-type network node is an intermediate provider node.

2. The information processing method of claim 1, wherein the HBH extension header or the DOH extension header comprises one of: the OPHS option, the OPH option, or an option source SID (OPS) option;
   wherein the OPHS option carries the hop limit field and the source SID information, the OPH option carries the hop limit field, and the OPS option carries the source SID information.

3. The information processing method of claim 1, wherein a length of the source SID information and a value of the source SID information are determined by one of the following parameters: a route of the second-type network node or an identifier assignment mode of a virtual private network (VPN) in which the second-type network node is located.

4. The information processing method of claim 1, wherein associating the corresponding second-type network node according to the second public network tunnel packet comprises at least one of:
   in response to determining that the second public network tunnel packet carries a DOH extension header and the DOH extension header carries an option source SID, OPS, option, reading source SID information in the OPS option, and associating the corresponding second-type network node according to the source SID information; or
   in response to determining that the second public network tunnel packet does not carry a DOH extension header or a DOH extension header carried by the second public network tunnel packet does not contain an OPS option, reading a destination address in the second public network tunnel packet, and associating the corresponding second-type network node according to the destination address.

5. The information processing method of claim 1, wherein a user network in which a network node is located comprises one of: an IPV6 network, an Internet Protocol version 4 (IPv4) network or a multiprotocol label switching (MPLS) network.

6. An information processing method, implemented by a third-type network node, comprising:
   receiving a double-layer Internet protocol (IP) packet sent by a first-type network node,
   wherein the double-layer IP packet is obtained by the first-type network node performing outer tunnel encapsulation on a traceroute packet, the traceroute packet is sent by a second-type network node to the first-type network node, and the double-layer IP packet comprises: the traceroute packet and a first public network tunnel packet, the first public network tunnel packet carries a hop-by-hop option header (HBH) extension header or a destination option header (DOH) extension header, and the HBH extension header or the DOH extension header carries a hop limit field of the traceroute packet and source segment identifier (SID) information assigned to the second-type network node by the first-type network node;
   performing a decrement-one operation on the hop limit field in an option hop limit and source SID (OPHS) option or the hop limit field in an option hop limit (OPH) option;

in response to determining that the hop limit field obtained after the decrement-one operation is performed is a first value, the information processing method further comprising:
  generating a response packet according to the traceroute packet, and encapsulating the response packet;
  performing outer tunnel encapsulation on the response packet to obtain a second public network tunnel packet, wherein a destination address of the second public network tunnel packet comprises one of: a source address of the first public network tunnel packet carrying the DOH extension header, source SID information in the OPHS option or the source SID information in an option source SID (OPS) option, wherein the DOH extension header carries the source SID information in the OPHS option or the source SID information in the OPS option; and
  sending the response packet and the second public network tunnel packet to the first-type network node; and
in response to determining that the hop limit field obtained after the decrement-one operation is performed is not a first value, further comprising:
  sending a double-layer IP packet carrying an HBH extension header to a next-hop network node;
  in response to determining that the next-hop network node is a public network node, continuing to forward the double-layer IP packet; and
  in response to determining that the next-hop network node is a private network node, copying content of the hop limit field in the OPHS option or content of the hop limit field in the OPH option to the hop limit field of the traceroute packet, and forwarding a packet with the first public network tunnel packet stripped to the private network node;
wherein the first-type network node is a provider edge, the second-type network node is a customer edge, and the third-type network node is an intermediate provider node.

7. The information processing method of claim 6, wherein the HBH extension header comprises one of: the OPHS option; the OPH option, or the OPS option;
  wherein the OPHS option carries the hop limit field and the source SID information, the OPH option carries the hop limit field, and the OPS option carries the source SID information.

8. An information processing device, comprising a communication module, a memory, and one or more processors;
  wherein the communication module is configured to perform communication interaction among a plurality of network nodes comprising a first-type network node, a second-type network node and a third-type network node;
  the memory is configured to store one or more programs; and
  the one or more programs, when executed by the one or more processors, enable the one or more processors to implement:
    in response to receiving a traceroute packet sent by the second-type network node, performing outer tunnel encapsulation on the traceroute packet to obtain a double-layer Internet protocol (IP) packet, and sending the double-layer IP packet to the third-type network node;
    wherein the double-layer IP packet comprises: the traceroute packet and a first public network tunnel packet, the first public network tunnel packet carries a hop-by-hop option header (HBH) extension header or a destination option header (DOH) extension header, and the HBH extension header or the DOH extension header carries a hop limit field of the traceroute packet and source segment identifier (SID) information assigned to the second-type network node by the first-type network node;
    wherein in response to determining that the hop limit field on which a decrement-one operation is performed is not a first value, sending the double-layer IP packet carrying the HBH extension header to a next-hop network node; in response to determining that the next-hop network node is a public network node, continuing to forward the double-layer IP packet; and in response to determining that the next-hop network node is a private network node, copying content of the hop limit field in an option hop limit and source SID (OPHS) option or content of the hop limit field in an option hop limit (OPH) option to the hop limit field of the traceroute packet, and forwarding a packet with the first public network tunnel packet stripped to the private network node;
    receiving a response packet and a second public network tunnel packet returned by the third-type network node; and
    associating a corresponding second-type network node according to the second public network tunnel packet;
  or, the one or more programs, when executed by the one or more processors, enable the one or more processors to implement:
    receiving a double-layer IP packet sent by the first-type network node;
    wherein the double-layer IP packet is obtained by the first-type network node performing outer tunnel encapsulation on a traceroute packet, the traceroute packet is sent by a second-type network node to the first-type network node, and the double-layer IP packet comprises: the traceroute packet and a first public network tunnel packet, the first public network tunnel packet carries a hop-by-hop option header (HBH) extension header or a destination option header (DOH) extension header, and the HBH extension header or the DOH extension header carries a hop limit field of the traceroute packet and source segment identifier (SID) information assigned to the second-type network node by the first- type network node;
    performing a decrement-one operation on the hop limit field in an option hop limit and source SID (OPHS) option or the hop limit field in an option hop limit (OPH) option;
    in response to determining that the hop limit field obtained after the decrement-one operation is performed is a first value, generating a response packet according to the traceroute packet, and encapsulating the response packet;
    performing outer tunnel encapsulation on the response packet to obtain a second public network tunnel packet, wherein a destination address of the second public network tunnel packet comprises one of: a source address of the first public network tunnel packet carrying the DOH extension header, source SID information in the OPHS option or the source SID information in an option source SID (OPS) option, wherein the DOH extension header carries the source SID information in the OPHS option or the source SID information in the OPS option; and sending the response packet and the second public network tunnel packet to the first-type network node; and in response to determining that the hop limit field obtained after the decrement-one operation is performed is not a first value, sending a double-layer IP packet carrying an HBH extension header to a next-hop network node; in response to determining that the next-hop network node is a public network node, continuing to forward the double-layer IP packet; and in response to determining that the next-hop network node is a private network node, copying content of the hop limit field in the OPHS option or content of the hop limit field in the OPH option to the hop limit field of the traceroute packet, and forwarding a packet with the first public network tunnel packet stripped to the private network node;

wherein the first-type network node is a provider edge, the second-type network node is a customer edge, and the third-type network node is an intermediate provider node.

9. The information processing method of claim 3, wherein in response to determining that the first-type network node assigns a label to the route of the second-type network node or the VPN in which the second-type network node is located, the length of the source SID information is a first-type byte; and in response to determining that the first-type network node assigns an Internet Protocol version 6 (IPv6) SID to the route of the second-type network node or the VPN in which the second-type network node is located, the length of the source SID information is a second-type byte.

10. The information processing method of claim 6, wherein a length of the source SID information and a value of the source SID information are determined by one of the following parameters: a route of the second-type network node or an identifier assignment mode of a virtual private network (VPN) in which the second-type network node is located.

11. The information processing method of claim 10, wherein in response to determining that the first-type network node assigns a label to the route of the second-type network node or the VPN in which the second-type network node is located, the length of the source SID information is a first-type byte; and in response to determining that the first-type network node assigns an Internet Protocol version 6 (IPv6) SID to the route of the second-type network node or the VPN in which the second-type network node is located, the length of the source SID information is a second-type byte.

12. The information processing method of claim 6, wherein a user network in which a network node is located comprises one of: an IPV6 network, an Internet Protocol version 4 (IPv4) network or a multiprotocol label switching (MPLS) network.

13. The information processing method of claim 6, further comprising:

in response to determining that the first public network tunnel packet carries the DOH extension header and the DOH extension header only contains the OPS option, reading the source SID information in the OPS option, wherein the source SID information is used to determine the next-hop network node.

14. The information processing method of claim 6, in response to determining that the first public network tunnel packet does not carry the DOH extension header or the DOH extension header carried by the first public network tunnel packet does not contain only the OPS option, the destination address is used to determine the next-hop network node.

\* \* \* \* \*